(12) United States Patent
Becherer et al.

(10) Patent No.: US 9,087,078 B2
(45) Date of Patent: Jul. 21, 2015

(54) SINGLE USER INTERFACE FOR SELECTING, MODIFYING, AND QUERYING IMAGES

(71) Applicants: Nico A. Becherer, Hamburg (DE); Sven Duwenhorst, Hamburg (DE)

(72) Inventors: Nico A. Becherer, Hamburg (DE); Sven Duwenhorst, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/626,714

(22) Filed: Sep. 25, 2012

(65) Prior Publication Data

US 2014/0089295 A1      Mar. 27, 2014

(51) Int. Cl.
   G06F 17/30           (2006.01)
(52) U.S. Cl.
   CPC ............................... *G06F 17/30247* (2013.01)
(58) Field of Classification Search
   CPC ................................................. G06F 17/30283
   USPC ................... 707/607, 697, 693, 706, 736, 758
   See application file for complete search history.

(56) References Cited

U.S. PATENT DOCUMENTS

| 5,680,528 | A  | * | 10/1997 | Korszun ........................ 345/630 |
|-----------|----|---|---------|-----------------------------------------|
| 6,519,608 | B1 | * | 2/2003  | Andersen et al. ..................... 1/1 |
| 6,718,075 | B1 |   | 4/2004  | Yamamoto |
| 7,374,077 | B2 |   | 5/2008  | Shimura |
| 7,831,069 | B2 |   | 11/2010 | Shah et al. |
| 7,952,593 | B2 |   | 5/2011  | Niu et al. |
| 2003/0107585 | A1 | * | 6/2003 | Samuelson ................... 345/629 |
| 2006/0286512 | A1 | * | 12/2006 | Cogliano et al. ................ 434/95 |
| 2008/0082426 | A1 | * | 4/2008 | Gokturk et al. ................ 705/27 |
| 2015/0052657 | A1 | * | 2/2015 | Miller ................................. 2/67 |

OTHER PUBLICATIONS

Changhu Wang, et al. "MindFinder: Image Search by Interactive Sketching and Tagging," WWW 2010, Apr. 26-30, 2010, Raleigh, North Carolina, USA. ACM 978-1-60558-799-8/10/04, pp. 1309-1312.

* cited by examiner

*Primary Examiner* — Sana Al Hashemi
(74) *Attorney, Agent, or Firm* — Kilpatrick Townsend & Stockton LLP

(57) ABSTRACT

Methods and apparatus are presented for a morphing search tool that provides a single user interface through which a user may both modify a displayed image and perform an image similarity query based on the modified image. The morphing search tool may allow a user to repeat this process until a desired image is found and displayed. Further, the image repository to be searched may be specified by a user and the images to be modified and searched for may be any type of image. The morphing search tool may be integrated within a merchant website, an image management system, or as a stand alone application.

23 Claims, 9 Drawing Sheets

SINGLE USER INTERFACE FOR SELECTING, MODIFYING, AND QUERYING IMAGES

BACKGROUND

Frequently a user searching for something may not know exactly what they are looking for, but they may have a good sense of at least some of the features they want. In particular, a user may be searching for an image with specific elements or features, where the image may correspond to a photograph of a scene or the image may correspond to an item being sought. For example, on a merchant website, providing a broad selection of items is usually seen as a positive. However, when a shopper is navigating an online merchant site with a nearly endless variety of options, the experience of finding the right item can become overwhelming and frustrating. When presented with a large number of options, a shopper must flip through endless web pages or catalog pages in search of an item the shopper may have in mind. In the worst cases, a shopper may become discouraged and fail to make a purchase. This frustration arises from existing systems being unable to provide a user with a manner to provide interactive and visual modifications to existing items or images in order to more exactly specify what the user is searching for, thereby streamlining the search experience and making for more satisfied users.

SUMMARY

In one embodiment, a morphing search tool may provide a single interface to provide a user with a variety of elements for an efficient image searching experience, where the elements within the single interface may include elements for receiving image modifications, elements for performing image queries, and elements for displaying search results.

In this way, a user may begin a search for, say, a dress, and be presented with a variety of initial images displayed within the interface. Given an initial selection of dress images, a user may begin to morph elements of a displayed dress to match a particular style of dress the user has in mind. Within the single interface, once the user has morphed the element or elements of the dress image, the user may initiate a search according to the modifications to the dress image made by the user. The interactive morphing search tool may then present search results according to the modifications provided by the user. In this way, the particular item the user is searching for may be more efficiently found because the user is spared the tedium of navigating through an endless display of options or specifying detailed search parameters. Further, while this example was presented in terms of searching for a dress, the interactive morphing search tool would work equally well for performing any image search.

Figure 1A:
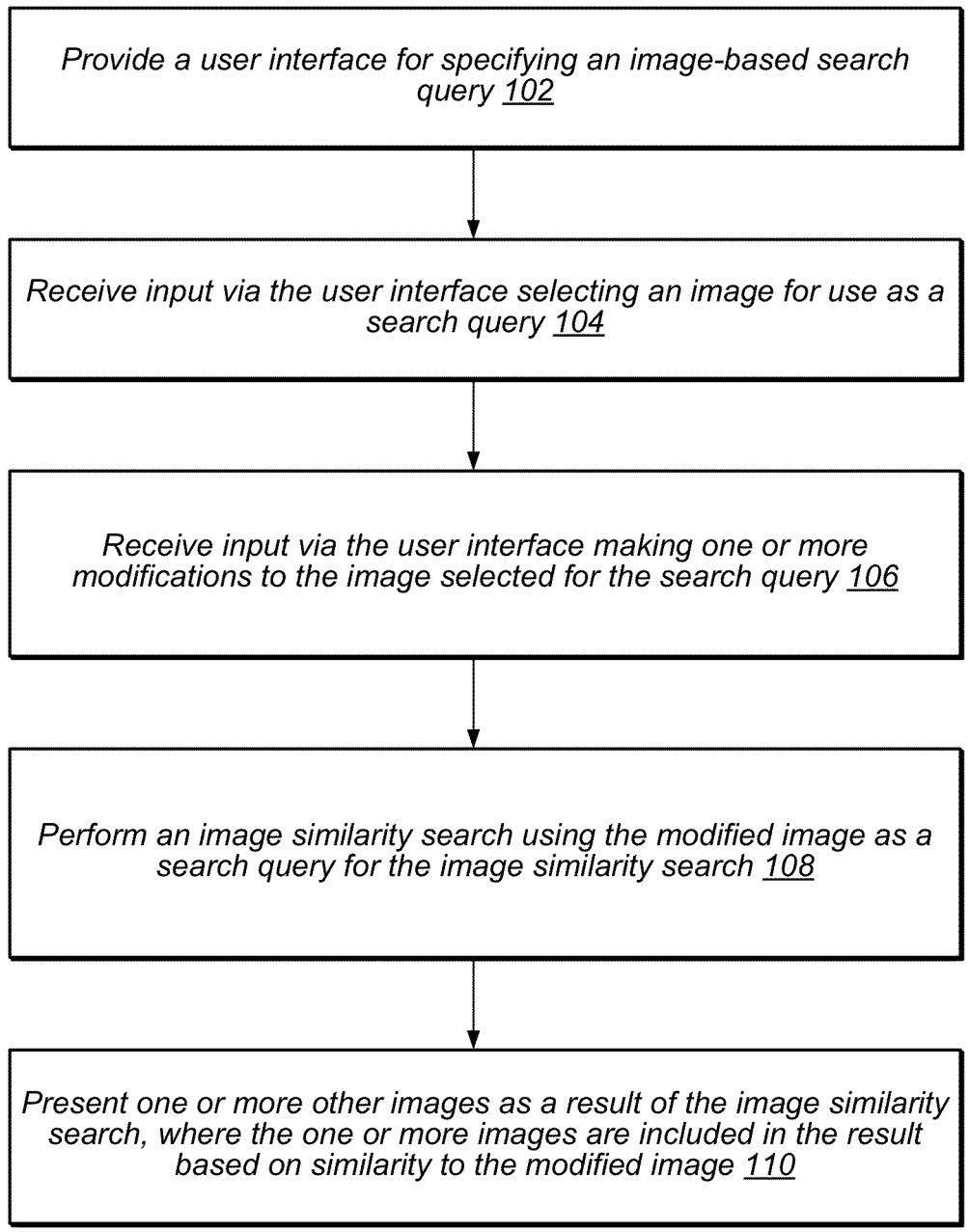
FIG. 1A is a flowchart of an embodiment of a morphing search tool, according to some embodiments.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Various embodiments are presented for a morphing search tool that may provide a single user interface through which a user may visually morph or modify an image, and upon completion of the modifications, the user may search for items matching the image and be presented with the search results in the same user interface. Further, each of the returned search images or results may be iteratively morphed to further refine a previous search.

In some embodiments, a user may begin a search from an initial image or set of images, thereby avoiding the need for a user to possess any particular artistic talent. In other words, a user would not draw an image to be searched from scratch, but rather a user would begin from an existing image or from an image taken by the user through a user interface of the morphing search tool. Further, in some embodiments, the morphing search tool may limit the scope of images searched based on a category or type of initial image. For example, if a user is searching for an hoop earring, the morphing search tool may restrict the scope of images searched to a relevant category such as jewelry and discard any image matches of items not within the scope, such as a hula loop or a machine washer.

For example, to begin, a user may enter a keyword search for an item, or select a category from a website, or select an image from a website or image repository. In this way, if a user enters "dresses" within a search box or clicks on a "DRESSES" link on a web or content page, the user may be presented with an initial set of dresses. From the initial set of dresses, the user may select any one dress from those displayed, and in response, the selected dress may be displayed within a palette or modification area of the user interface from which the user may perform modifications to the dress.

In some embodiments, instead of selecting a dress to appear in a modification area, the user may simply begin modifying the dress in the location where is presented within the search results of the interface for the interactive morphing search tool. Further, a user may make modifications to more than one presented dress before initiating a search. In this way, the user may simultaneously search for multiple styles of a particular item.

In some embodiments, the morphing search tool may be implemented into a computer system in a store kiosk. A user may then walk up to the kiosk, and from the user interface displayed on the kiosk display, the user may click speak, "find me trousers like the ones I'm wearing", and the morphing search tool may respond with taking a picture of the user's trousers and performing an image similarity search based on the photograph of the trousers. In this example, the morphing search tool may present a variety of matching trousers to a user within the user interface, and the user may proceed to select a particular image of particular trousers and begin to modify the image for an additional image similarity search to be performed.

In some embodiments, the morphing search tool may be implemented on a mobile device application, where the morphing search tool may provide an interface for a user to perform image searches. For example, a user may be walking down the street and see a bicycle that the user likes so much the user would like to purchase the bicycle, except a version of the bicycle with different handlebars. In such an instance, the user may select the morphing search tool application, use the interface of the morphing search tool to take a picture of the bicycle, and then modify the image of the bicycle according to what the user has in mind. Once the user has used the user interface of the morphing search tool to modify the image of the picture taken of the bicycle, the user may perform an image similarity search to find a bicycle matching the morphed image.

In other embodiments, a user may search for any other type of image. For example, a travel writer may be searching for a beach with white sands and a single palm tree. In this example, given an initial image of, say, simply a beach, the interactive morphing search tool may determine the most appropriate palette of image modification tools for applying to the initial image. In this example, the interactive morphing search tool may analyze the elements of the initial beach image and determine that the scene is a beach scene and a modification palette may be determined to include palm trees, appropriate color options for coloring elements of the initial image, a moon, a sun, small waves, large waves, or other appropriate geographical features. With the modification palette, the user may set the initial image to day or night, add or remove palm trees, change the color of the sand or water, or add a mountain in the background.

Further, in some embodiments, the modification palette may include a search box for the user to search for an image or feature to select to add or modify the initial image. For example, the initial modification palette displayed within the interactive morphing search too interface may have a palette of options based on the initial image. In this example, the initial modification palette may lack what the user wishes to add to the initial image, and, within a search box of the interactive morphing search tool interface, the user may search for say, "coconut", and in response, the interactive morphing search tool may provide one or more images of a coconut that the user may then select to add to the initial image, either to lay the coconuts on the sand of the beach, or to place the coconuts within the palm trees. In this way, given an initial image of simply a beach during the day, a user may add palm trees, scatter coconuts on the beach, add a crescent moon and make the time of day nighttime, and search for images matching the modified, or morphed image.

In some embodiments, the initial display of the interactive morphing search tool may be a blank display interface with an arrangement of search interfaces allowing for a user to keyword search for an initial image, or to allow the user to select an image repository to search, or to allow a user to select a website for shopping for an item, or to simply search across the Internet. For example, a user may wish to search for a particular image within a local repository of image.

In some embodiments, the morphing search tool may be integrated into the interface of an internet search tool, or a website interface, or into any other software application providing a user with the ability to search for images. For example, the morphing search tool may be integrated into a dating website, where a user may upload an image of someone. The user may then modify the uploaded image, for example, with a modification to lengthen hair, to change eye color, or to change skin tone. Based on the image modifications, the morphing search tool may then perform an image similarity search based on the modified image and present the user with image results drawn from a pool of other online daters.

In the following detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Morphine Search Tool

FIG. 1A illustrates a flowchart highlighting example processing stages that may be present in an embodiment of a morphing search tool. As discussed above, the morphing search tool may provide a single user interface through which a user may both modify a given image and to perform an image similarity query based on the morphed image, where the results of the image similarity query are presented within the same user interface. Providing a user interface for specifying an image-based search query is reflected in stage 102.

In some embodiments, to begin, the morphing search tool may receive input from the user interface, where the input is a selection of an image for use as a search query, as reflected in stage 104. For example, a user may use File 137 to open an image file. In another example, the user may elect to use the user interface to choose to snap a picture, where the picture may be captured in response to the user selecting camera icon 142, and where the camera may be part of the computing device on which the morphing search tool is implemented and executing.

In some embodiments, a user may use the camera user interface of the morphing search tool to input a multi-angle view of an image. For example, a user may use a video mode for the camera to provide a 360 degree view of an item, or a user may take multiple snapshots to be used for a single search for an image. While many images may not have information beyond flat, two-dimensional information, in some cases, the video image or multiple snapshots of the single image may be analyzed to extract feature information that may be useful in matching a two-dimensional image. For example, a user may take two snapshots of a dress, a front and back, and the back of the dress may be strapless. The morphing search tool may then use the feature information regarding the dress being strapless to guide the image similarity search, for example, metadata for an image being compared may specify that the current image is of a dress that is strapless. In this way, even though the back of the image being considered is not visible, and would therefore provide no information regarding being strapless based entirely on a visual analysis of the image, the metadata for the image may allow the morphing search tool to determine a match based on the information extracted from an analysis of the multiple images serving as the query image.

Once a user has selected an image, the user interface may receive input making one or more modifications to the image that has been selected for the search query, as reflected in stage 106. Modifications to the selected image may be made through a variety of user input devices or gestures. For example, with a mouse a user may click and drag on any part of the image to morph the image in accord with the mouse movement. In other example, a user may be using a device with a touch-sensitive screen and a user may tap and drag, or tap and expand, or tap and pinch, or use any other gesture indicative of a modification to the image. Other forms of input directed to modifying the image are also possible, such as responses to voice commands or responses to visually detected gestures.

In some embodiments, in addition to the modification resulting in an image characteristic used to match images in an image similarity search, the modification may be analyzed to describe the modification. For example, if a belt is added to an image, then metadata may be created describing the presence of the belt along with any characteristics of the belt that may or may not be apparent from the visual representation of the belt within the modified image. In other words, a brown leather belt may appear nearly indistinguishable from a brown pleather, or fake leather belt, however, a budget-conscious user or a user with moral objections may specifically be in search of a fake leather belt instead of a leather belt. In such a case, a user may specify the type of belt being added and the type information may be considered when performing an image similarity search. For example, a user may right-click on belt 140 or belt 150 and be presented with a list of options, where some of the options may indicate material or color or texture. The information specifying characteristics of the added feature, in this case, a belt, is added to metadata for the image, where the metadata may be stored in state information that corresponds to the image.

In some embodiments, a use may provide voice commands to refine or further refine an image similarity search. For example, a user may, for a given selected image, speak a verbal description of features the user is interested in an image having. For example, a user may click on the microphone 154 icon and speak, "plastic leather belt with no buckle", and similar to the metadata added above, the description spoken by the user is used in determining the strength of an image match in an image similarity search. In some embodiments, similar descriptive information may be added, for example, with a user right-clicking on a particular feature of image 138 and selecting an option to input descriptive information. The descriptive information may be any type of information describing any visual elements of image 138. In some embodiments, both visually descriptive information and information regarding other characteristics of an image may be provided, for example, "widen shoulders", "add v-neck", "add empire waist", "under $100", or "made in the USA", or "immediately available", or "free shipping".

The input received to modify the image may be immediately implemented and result in the modified image being displayed to the user. In some embodiments, an image similarity query may be performed in response to a single completed modification and performed immediately after the modification is complete. For example, if a user modifies the neckline of a dress, as soon as the modification is complete, an image similarity query is performed to match images based on the dress with the modified neckline.

In other embodiments, the morphing search tool may receive one or more modifications and defer an image similarity query until an input is received from the user that an image similarity query is desired. Configuring the trigger for the image similarity query may be a user configurable setting.

The morphing search tool performing of an image similarity query using the modified image as a search query for the image similarity search is reflected in stage 108. For example, after one or modifications are received and implemented, a user may select image similarity query 116, and in response to the selection, an image similarity query is performed.

The image similarity query may produce more matches than can be presented or displayed within the morphing search tool user interface, in which case, if n images may be displayed, then the top n image matches are selected for display. The one or more images produced as a result of the image similarity search may then be presented within the user interface, where the one or more images are included based on similarity to the modified image, as reflected in stage 110.

In some embodiments, the results produced from an image similarity search may depend on previously found images from previous image similarity searches. For example, the morphing search tool may be configured such that previously found and presented images that were not selected and that match a current search are to be negatively weighted so that they are less likely to appear in current image similarity search results.

Figure 4:
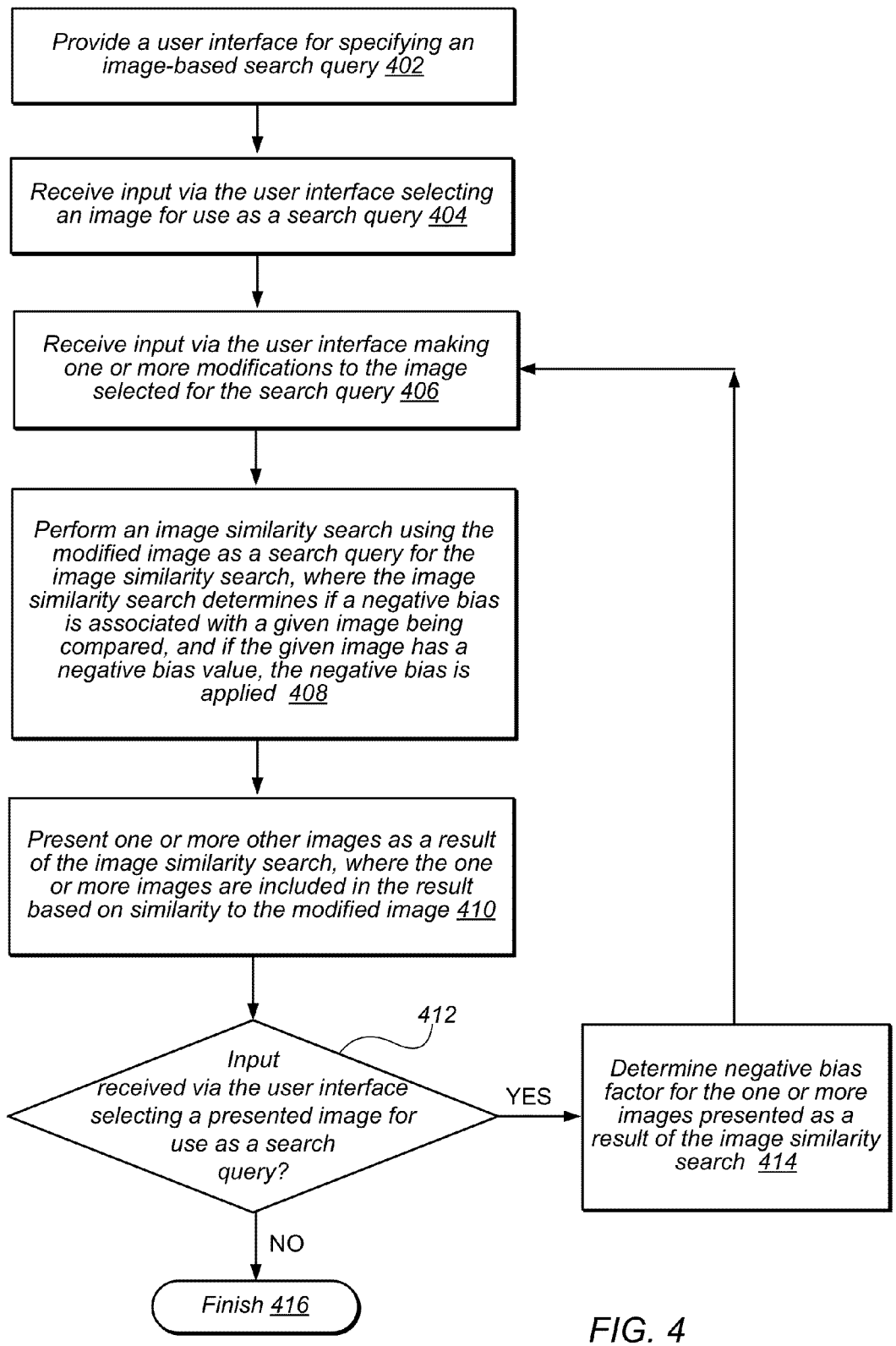
FIG. 4 is a flowchart of an embodiment of a morphing search tool incorporating a negative bias for past search results, according to some embodiments.

FIG. 4 illustrates a flowchart highlighting example processing stages that may be present in an embodiment of a morphing search tool that uses a negative bias for subsequent image searches. This flowchart contains processing stages similar to those described above in regard to FIG. 1A, however, this flowchart also includes elements related to implementing a negative bias for prior search results.

This processing configuration may be set in order to implement a search philosophy that considers search results that were presented to a user yet not selected to be search results that the user has affirmatively determined to not be a match, therefore, these unselected search results are either prevented from appearing in future search results or the unselected search results are weighted such that any quantification of a strength of a match to a current image search are unlikely to be selected for display in the user interface.

Similar to the flowchart in FIG. 1A, the flowchart in FIG. 4 depicts providing a user interface for specifying an image-based search query, as reflected in stage 402, receiving input through the same user interface for selecting an image for use as a search query, as reflected in stage 404, and receiving input through the same user interface making one or more modifications to the image selected for the search query, as reflected in stage 406.

At stage 408, the implementation of the image similarity search is different than as described above for stage 108 of FIG. 1A. Specifically, at stage 408, an image similarity search is performed using the modified search image as a search query for the image similarity search, where the image similarity determines whether or not a negative bias has been associated with a given image being compared, where if the given image being compared is associated with a negative bias, the negative bias is applied to the search results as they would be produced through a normal image comparison.

For example, an image similarity search may determine an initial measure of similarity through the comparison of features that may have been extracted through a scale-invariant feature transform to detect and describe features within an image regardless of the scale, noise, or lighting within the image. Further, some images, for example images stored in a catalog for a merchant, may have associated metadata describing aspects of the image. For example, in the case of a product item, the metadata may describe a size, color, texture, or other features for the product, and this metadata may serve as an additional basis for finding image matches in an image similarity search.

Given an initial measure of similarity for a given image being compared, the morphing search tool may access state information corresponding to the given image being compared. If the state information for the given image being compared indicates that a negative bias value has been previously stored during a current search session, then the stored negative bias value is applied to the initial measure of similarity for the given image.

In some embodiments, the state information for a given image regarding a negative bias value may be modified to increase the negative bias value depending on affirmative indication of a non-match. For example, given a displayed set of image results, a user may indicate that a particular image is not to be considered as a match, such as through the selection of a close window "X" 144 in FIG. 1B. In response to the removal of image 146, the morphing search tool may set the state information corresponding to image 146 to prevent image 146 from appearing in future search results of the current search session, and also to replace image 146 with an image that is the next best match from the most recent search results. In some cases, instead of the next best match, an image from among the next n matches is considered, where the replacement image selected is most different from the deleted image.

Once the image similarity search incorporating a negative bias consideration, the one or more images resulting from the search are presented, where the one or more images are included in the results based on their similarity to the modified image as reflected in stage 410.

If a user is satisfied with the presented one or more image search results, then no further input for selecting a presented image will be received as a search query through the user interface, in which case processing for the morphing search tool goes from stage 412 to stage 416. In some cases, the completion of an image search may be determined in response to user input indicating an intent to purchase an item, or to save the image, or some other indication from the user interface that indicates that the user is satisfied with the image search result.

If the user is not yet satisfied with the image search results, processing may continue to stage 414, where each of the current slate of presented image search results has respective state information modified to include a negative bias value to be used in future search results.

Once the state information for each of the currently presented image results has been updated, processing may continue to stage 406, where a user may again provide input through the morphing search tool user interface for making one or more modifications to the selected image for a new search query. This process may continue until a user finds the particular image desired.

In some embodiments, for example when a selected image is a raster image, the morphing search tool may calculate a silhouette for an item within the image, and allow a user to morph any point along the silhouette. For example, given a silhouette, a user may select a point along the silhouette and expand or contract the shape of the image, resulting in a morphed image.

Figure 1B:
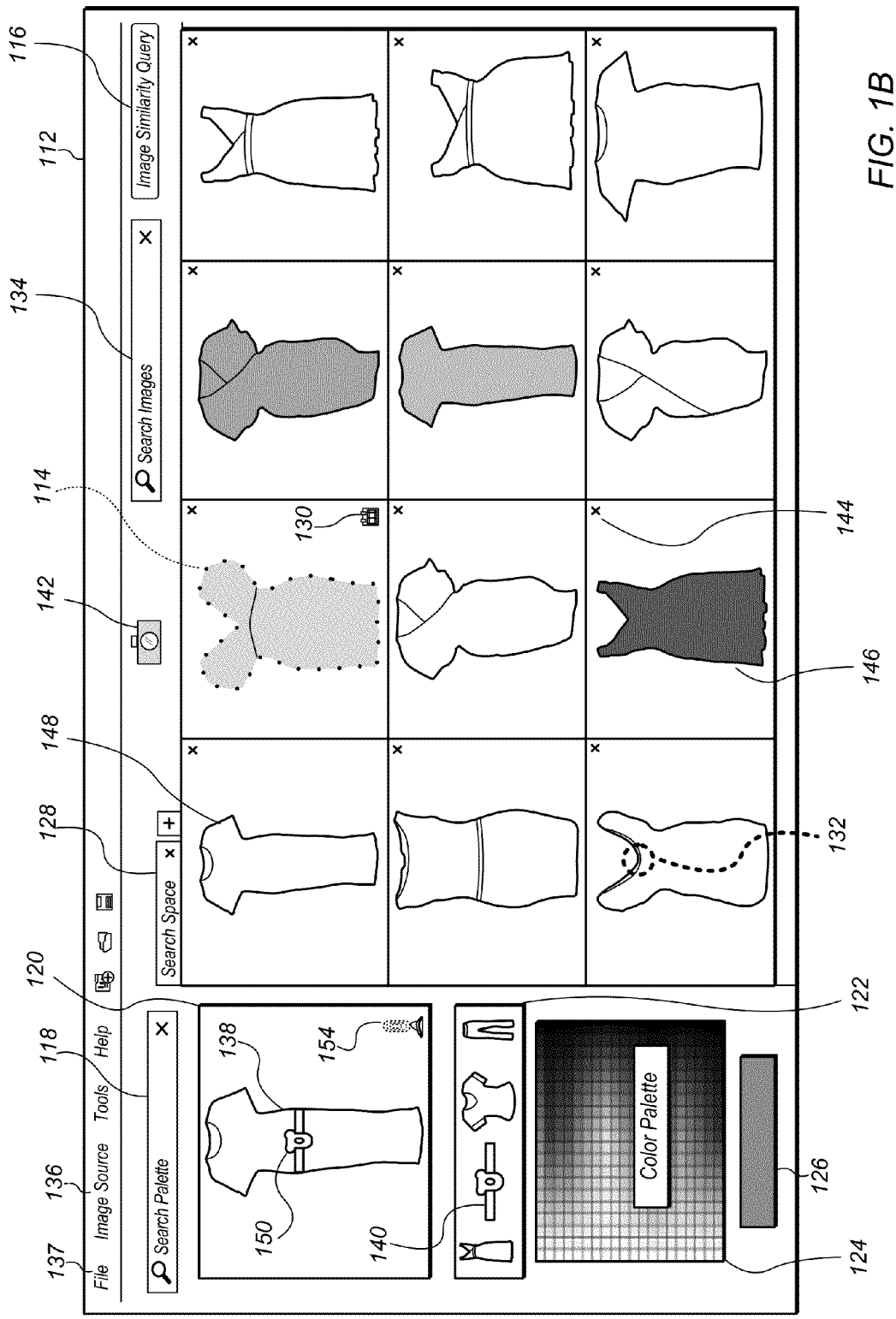
FIG. 1B depicts an illustration of a user interface for a morphing search tool, according to some embodiments.

FIG. 1B illustrates an embodiment of a user interface 112 for the morphing search tool, which includes various user interface elements allowing a user to—from within the same user interface—morph a given image or images and to initiate an image query to find images that are similar to the morphed imaged.

The morphing search tool may provide, within the same user interface, elements for receiving image modifications and elements for performing image modifications. In one embodiment, for example, image 114 of FIG. 1B is an image of a dress, where the outline of the dress transforms from a solid line to a dotted line in response to a user selecting image 114. A user may select image 114 with a mouse click, or on a touch sensitive display device, with a finger tap over image 114. In this example, each dot of the outline is selectable for modification, where a user may click and drag a given dot to a new position. In this example, each selectable dot may be considered an element for receiving image modifications. As a result, or in response, to the dot in the outline being moved to a new position, the outline of the image is correspondingly modified, or warped, or morphed.

In some embodiments, an icon 130 may be selected to enable a mirrored mode in order to allow a user to make symmetric modifications to the image. For example, if a user selects and drags a given point on the image to expand the image, a corresponding point on the opposite side of the image is symmetrically dragged, resulting in a symmetric expansion of the image. In this way, if a user would like to lengthen or shorten a sleeve on a dress, then the user need only make the modification to a single sleeve if the mirroring mode has been enabled through the selection of icon 130.

In other embodiments, a given image would not need to be first selected prior to a modification of the image, and the outline would remain the same. In such a case, the elements for receiving image modifications would be the morphing search tool detecting that an input has been received within an area of an image that has been determined to be adjustable, and responding to the input to perform the morphing of the image in accord with the user input. For example, a user could tap or click on region 132, and the user could morph the image through a drag operation. Region 132 is one of several regions within and around the image that a user may select to begin a morph of the image.

In some embodiments, prior to a display of any images, a user may begin an initial search upon entering, for example, the keyword "dress" within Search Images 134. As a result of performing the search using keyword "dress", the morphing search tool may display the several dresses within Search Space 128.

Further, the morphing search tool user interface may display one or more images, as depicted within the Search Space 128 panel of user interface 112 in FIG. 1B. In one embodiment, the initial set of displayed images within Search Space 128 may be displayed in response to a user entering a keyword search within Search Images 134. The user may specify the database, or image repository, or website to be searched, for example, through selecting menu option 136, and entering or selecting the target image source to be searched.

The morphing search tool user interface, as noted above, may receive input indicating a modification to one or more aspects of a displayed image from among the multiple images displayed within the morphing search tool user interface, where the input indicating a modification may be received through an element of the user interface for receiving image modifications. Examples of the morphing search tool user interface elements for receiving image modifications have been discussed above.

In the above examples of the morphing search tool receiving input indicating a modification, the input was received directly where the images were initially displayed. However, in some embodiments, a user may select a given image from among all of the images displayed, and the image, in response to the selection, may appear within a palette or modification area of the user interface. For example, in response to a user clicking or tapping, or otherwise selecting image 148, a copy of image 148 may be displayed within modification area 120, where the copy of image 148 is depicted by image 138.

With the copy image 138 displayed within modification area 120, a user may use any of the visual modification tools available through direct morphing of the image, or through modifications applied through the use of feature palette 122 or color palette 124. For example, a user may select belt 140 and drag the image of the belt onto image 138 within the modification area 120. In some cases, the user may wish to alter the color of the dress and the user may select a given color from color palette 124, where in response to a color selection, current color selection indicator 126 may change to reflect the current color selection.

Belt 140 may be among several features available to a user for modifying the image, and the features selected for display may be determined according to an analysis of the currently selected image, or based on metadata describing the current image. For example, the morphing search tool may deconstruct the elements of the selected image to recognize that the image is a dress. Once the morphing search tool determines what the image represents, then the morphing search tool may determine what types of features would be useful to present to a user for modifying the image. In this example, given a dress, the morphing search tool may determine that pockets, belts, fabric types, neck lines, ruffles, or any other feature appropriate to a dress may be useful to display within the feature palette 122. Similarly, for a different type of image, the morphing search tool may determine, based on an analysis of the features of the image, an appropriate set of features to provide for modifying the original image.

For example, a user may be searching for hats, in which case, the feature palette 122 may be displayed to include bands, feathers, appropriate materials such as straw, or felt. Similarly, if the user is searching for jewelry, the feature palette 122 may be displayed to include loops, diamonds, various precious or semi-precious stones, metal types, or a material type, or even a size category indicating a small or big piece of jewelry.

In some embodiments, an added feature, such as belt 150 added to image 138, where belt 150 is selectable to be morphed. For example, a user may add color to the belt or increase the size of the buckle, or remove the buckle altogether, or specify the material the belt is made from.

Once a user has completed one or more modifications to one or more aspects of an image, the user may initiate an image similarity search, for example, through the selection of the image similarity query 116 button. In response to receiving the input through an element of the user interface for performing image queries, in this case the image similarity query 116 button, the morphing search tool may perform an image similarity query using the image as modified according to the modifications to the one or more aspects of the image.

The morphing search tool may use any one of a number of different methods for identifying images that are similar to the images as modified according to the user modification input. In some cases, to determine whether or not an image is similar, the morphing search tool may place a greater emphasis on the elements as modified according to the user. For example, if two dresses or images under consideration may possibly be determined to be similar, the morphing search tool may select the image that most closely matches as aspect modified by the user even though the other image may match other aspects of the image as modified according to the user input.

Once the morphing search tool has determined a set of images to be similar, the set or image results may be displayed within the morphing search tool user interface, for example within Search Space 128.

Given a new slate of images displayed within Search Space 128, the user may iteratively perform the same steps in morphing or modifying one of the displayed images. Assuming for this example, that there are hundreds or thousands of dresses within inventory, a search based on an image as modified according to exactly what a user has in mind may reduce the overall time spent identifying a match to what the user will purchase. Further, given a more efficient and satisfying search experience, the morphing search tool may reduce the probability that a user would become frustrated and end a search before making a purchase.

Figure 2A:
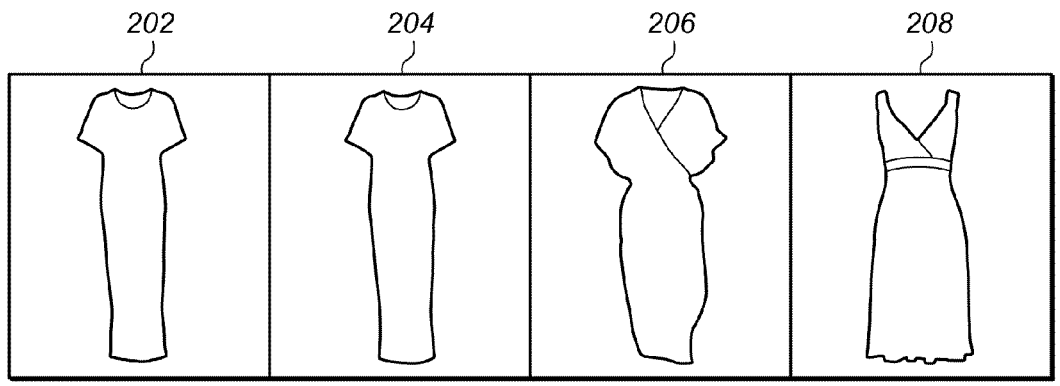
FIGS. 2A-2C depict illustrations of several aspects of image morphing and corresponding image similarity search results, according to some embodiments.
Figure 2B:
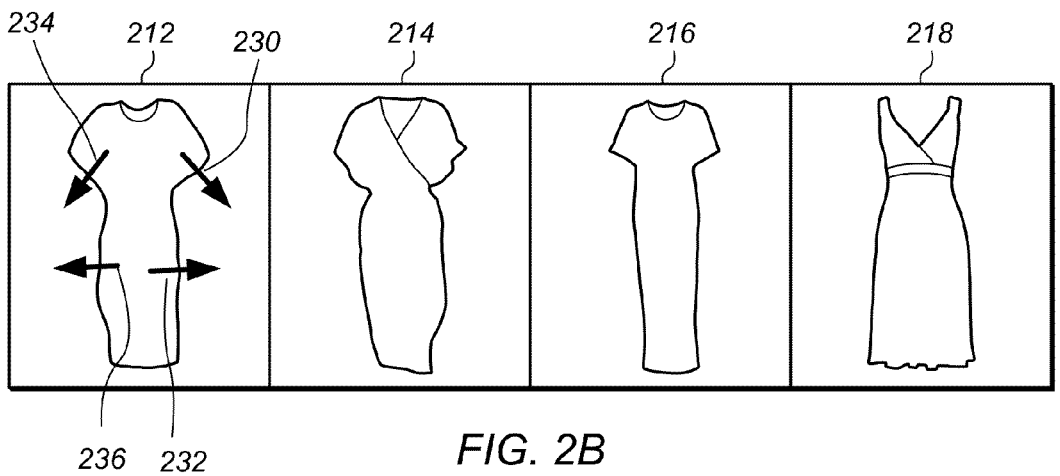
Figure 2C:
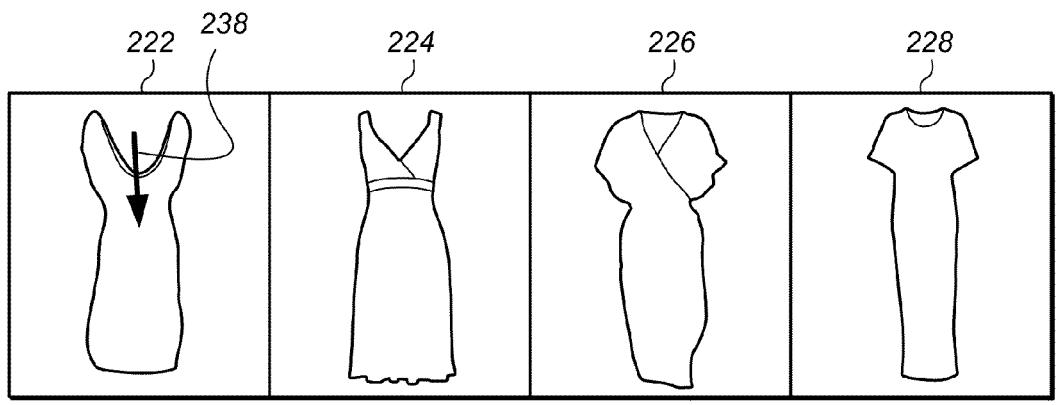

FIGS. 2A-2C depict varying degrees of a match to a morphed image based on a given modification or modifications to the image. For example, in FIG. 2A, the query image is image 202, and the morphing search tool may produce three images as a match, images 204, 206, and 208. In this example, image 204 is the best match, image 206 is an average match, and image 208 is the weakest match. In this example, the morphing search tool may determine that the neckline, sleeves, and length of query image 202 best match these corresponding features of image 204. Similarly, image 206 differs from query image 202 in the width of the dress and in the neckline, therefore image 206 is considered an average match, which matches some, but not all of the features of the query image. Similarly, image 208 differs most from query image in that image 208 has a different shaped bottom half, has a belt, has no sleeves, and has a different neckline. In cases where there were too many image results and some images could not be displayed within the morphing search tool user interface, the best matches would be displayed first.

FIG. 2B depicts a set of image search results 214, 216, and 218 based on modifications 230, 232, 234, and 236 applied to image 202, which result in a different type of sleeve and a wider dress. Based on modifications 230, 232, 234, and 236 as applied to image 202, the morphing search tool performs an image similarity query using image 212. Based on image 212, the image similarity query produces, from best match to worst match, images 214, 216, and 218. In this instance, image 214 is the best match because of the modifications widening the query image 202 based on morphs 236 and 232 and because of morphs 230 and 234 to the sleeves.

FIG. 2C depicts another example of a morph 238 applied to image 222, and the resulting best matches, from best to worst, images 224, 226, and 228. In this example, as a result of dropping the neckline down according to morph 238, the best matching image is image 224, which has a similarly dropped neckline, while also providing the best match based on sleeves.

Figure 3:
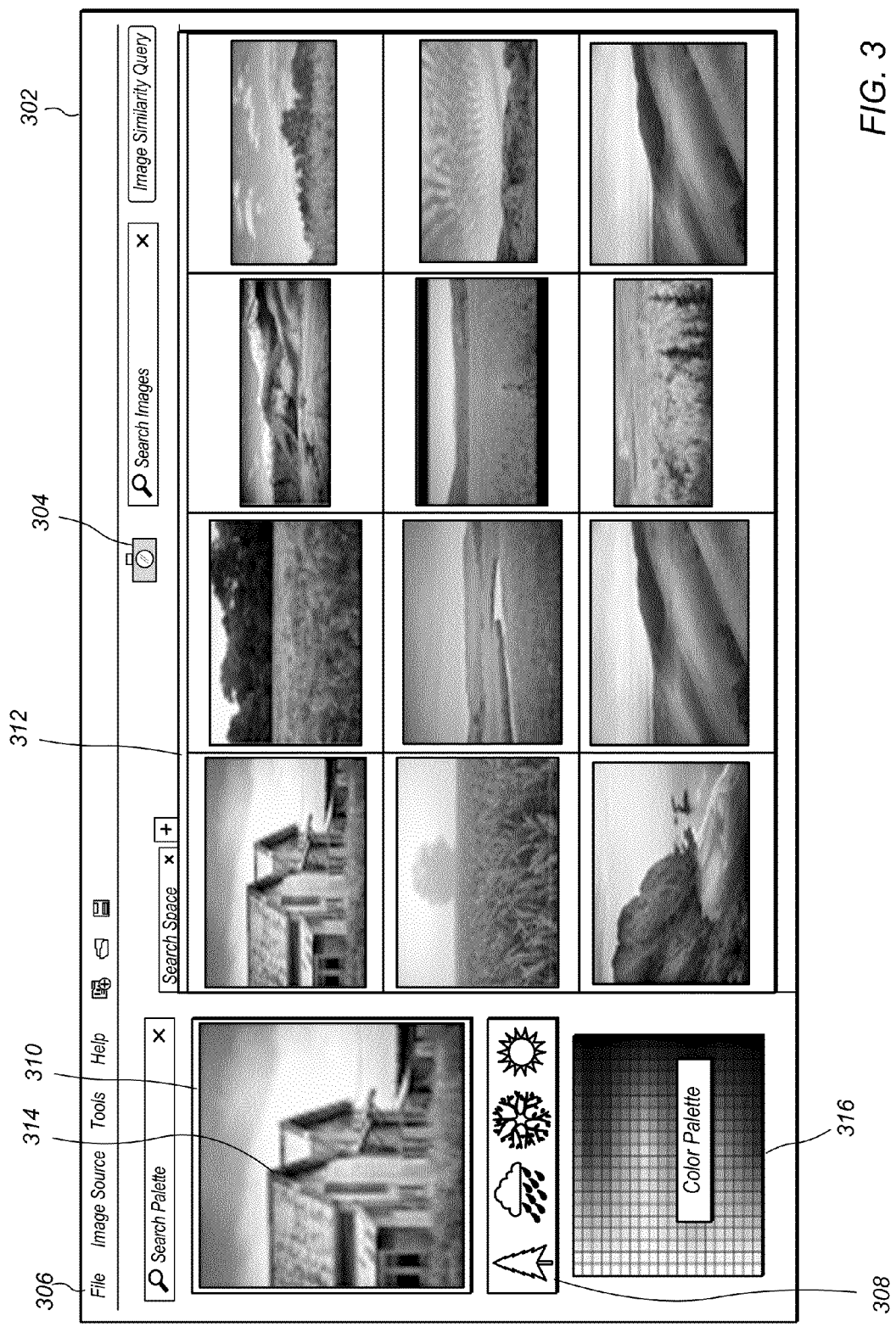
FIG. 3 depicts an illustration of a user interface where image modifications may be applied to pastoral images, according to some embodiments.

FIG. 3 illustrates an embodiment of a user interface 302 for the morphing search tool. In this embodiment, similar to the embodiment depicted within FIG. 1B, a user may perform an image similarity query from within the same user interface from which the user performs image morphs or modifications on an image. In some embodiments, the user may elect to take a photograph to serve as an initial image, for example, through the selection of the camera icon 304. In this example, in response to selecting camera icon 304, the user may use a built-in camera on the device implementing the morphing search tool for taking a photograph of the image the user would like to use as an image onto which to perform modifications. In other embodiments, the user may select File 306 to select a local image or an image stored remotely at an image repository or website.

As described above, the morphing search tool may determine an appropriate morphing tool palette 308 based on an analysis of features of image 310. In some cases, when a user enters a keyword search to find an initial set of images, the keyword or keywords entered may serve as a basis for the morphing tool palette 308. In other cases, the morphing tool palette 308 may be based on an analysis of a set of images produced in response to a keyword search. For example, based on an analysis of image set 312, the morphing search tool may determine that appropriate features may include trees, the sun, elements of weather such as rain or snow, or geographic features such as mountains, hills, rivers, or lakes. In some cases, based on an analysis of image set 312, the morphing search tool may determine that appropriate features may include a barn, a barbed wire fence, farm animals such as cows, or a windmill. An example morphing tool palette 308 includes some of these determined features.

In this example, image 310 may be composed of various visual elements, such as grass, buildings, and clouds. In some embodiments, the morphing search tool may analyze and recognize individual elements of the image in order to allow a user to select one of the elements, for example, one of the buildings, building 314. For example, prior to the analysis, the image 310 may be a raster image including pixel information. However, subsequent to an image analysis, image 310 may be converted to a vector based image, where the building may be defined in terms of lines and shapes, and where the shapes are individually selectable.

Once the building has been selected, the user may use color palette 316 to select a new color for the building. For example, the user may be searching for an image similar to image 310, but with a green building and a tree in the background.

Morphine Search Tool Module

Figure 7:
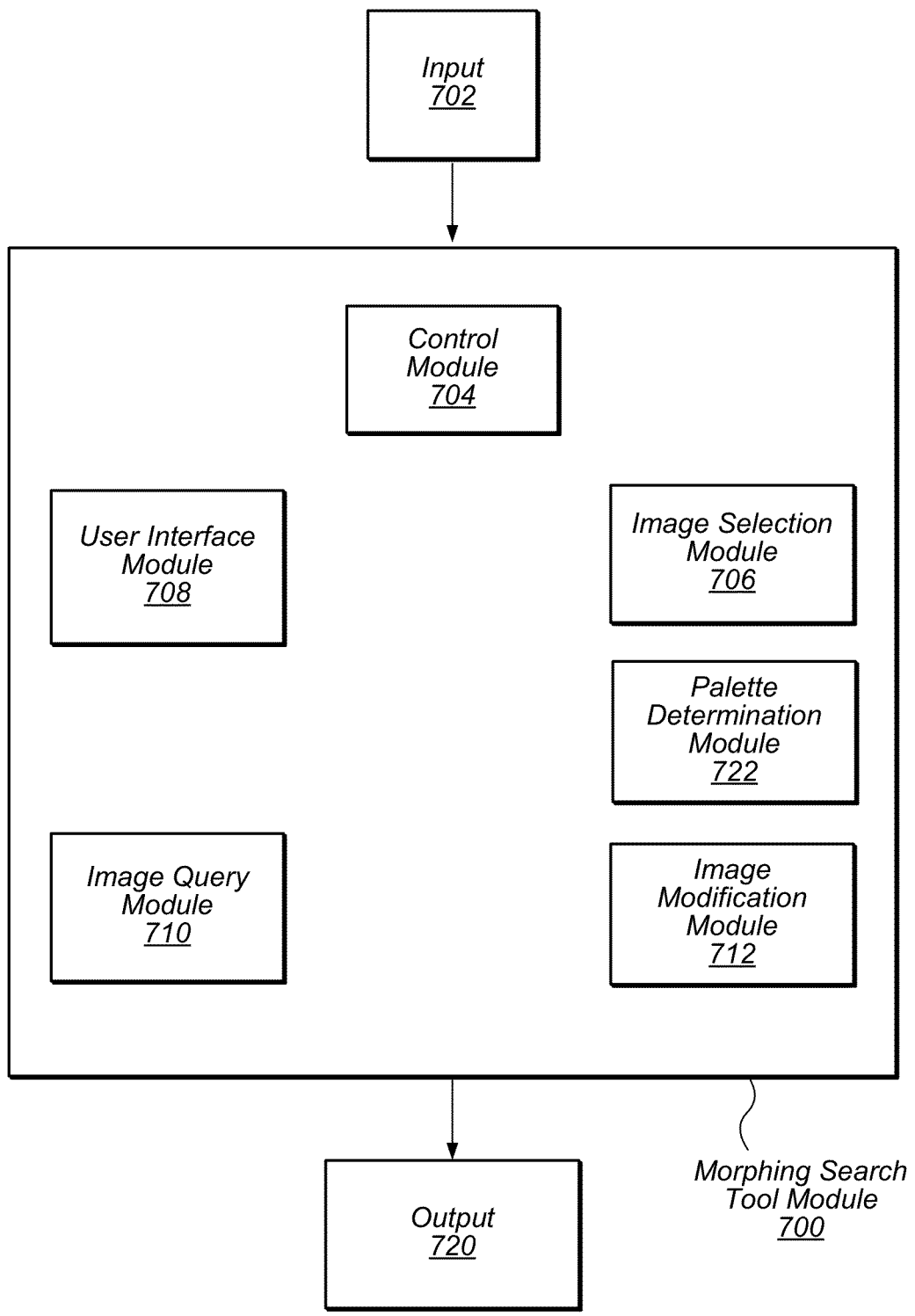
FIG. 7 illustrates a morphing search tool module, according to some embodiments.

FIG. 7 illustrates an embodiment of a Morphing Search Tool Module 700. As noted above, the morphing search tool may be implemented in a variety of different embodiments, including a stand-alone application.

In some embodiments, User Interface Module 708 may provide, through Output 720, a variety of user interface elements of a single user interface, controlled by Control Module 704, for allowing a user to select an image, modify an image, and perform an image similarity search, as described above in regard to FIGS. 1A, 1B, 2A-2C, 3, and 4.

Given a display of various images, Image Selection Module 706 may detect input received through a user interface element selecting a particular image for use in an image similarity search. Further, once an image has been selected, Palette Determination Module 722 may analyze a selected image to determine an appropriate palette of features for the user to use in modifying the selected image. Image Modification Module 712 may detect, through one or more user interface elements of the single user interface, user input for modifying the selected image.

Through Image Query Module 710, the Morphing Search Tool Module 700 may perform an image similarity search. Image Query Module 710 may also store information regarding past search result images, and determine whether or not a negative bias is to be applied to current and future image similarity searches.

Upon completion of an image similarity search, a number of image results may be provided for display to the user as Output 720.

Client/Server Architecture

Figure 5:
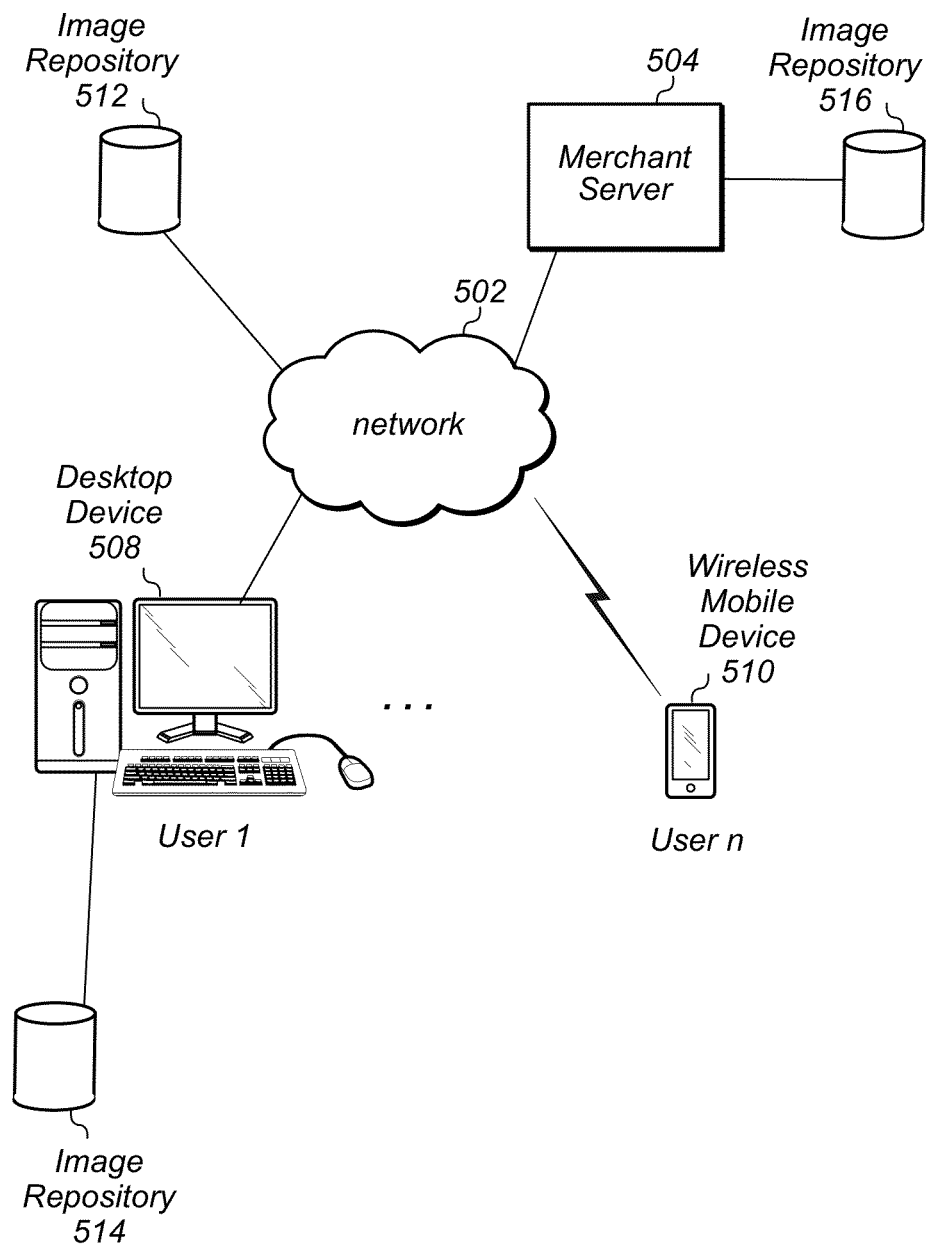
FIG. 5 depicts an illustration of a client/server architecture in which the morphing search tool may be implemented, according to some embodiments.

FIG. 5 depicts an illustration, according to one embodiment, of a computing environment in which a morphing search tool may be implemented on a merchant server and the morphing search tool user interface is provided to a client user over a network.

For example, the morphing search tool may be implemented to operate within a web page or content page provided from the merchant server 504, where the user at a client device 508 or 510 may access the web page or content page over network 502. As discussed above, the morphing search tool may be directed to search a particular image repository or database, where a given image repository may be accessed locally, such as with image repositories 514 and 516, or over a network, such as image repository 512.

Cloud Computing Environment

Figure 6:
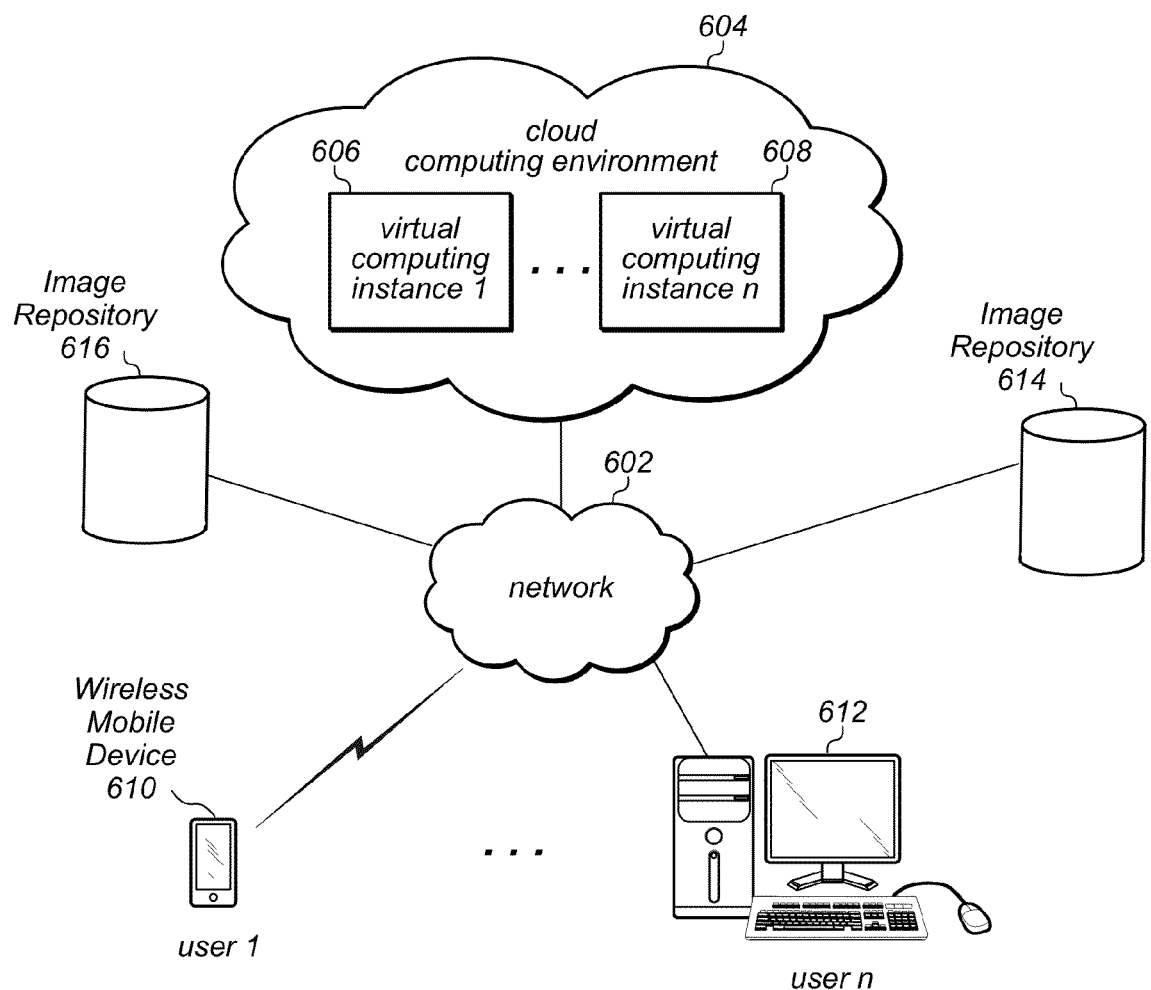
FIG. 6 depicts an illustration of a cloud computing environment in which the morphing search tool may be implemented, according to some embodiments.

FIG. 6 depicts one possible computing environment that includes devices 610 and 612 accessing a cloud computing environment 604 over network 602. In this example, an installed application on device 610 may be used to access any of the above-discussed embodiments of a morphing search tool executing within one of the virtual computing instances 606 through 608. In this example, each of the computing instances 606 through 608 may access one or more image repositories, such as image repositories 614 and 616.

Further, in some embodiments, different combinations of the above-discussed computational elements of a morphing search tool may be implemented locally on device 610 and remotely within one of the virtual computing instances 606 through 608.

In other embodiments, the user interface of the morphing search tool may execute on computer 612, which may access cloud computing environment 604 over network 602. In this example, the image similarity search, which may be computationally intensive, may be performed within cloud computing environment 604. This configuration may be particularly useful for mobile device 610, which may have a limited amount of memory and computational resources.

Example Computer System

Figure 8:
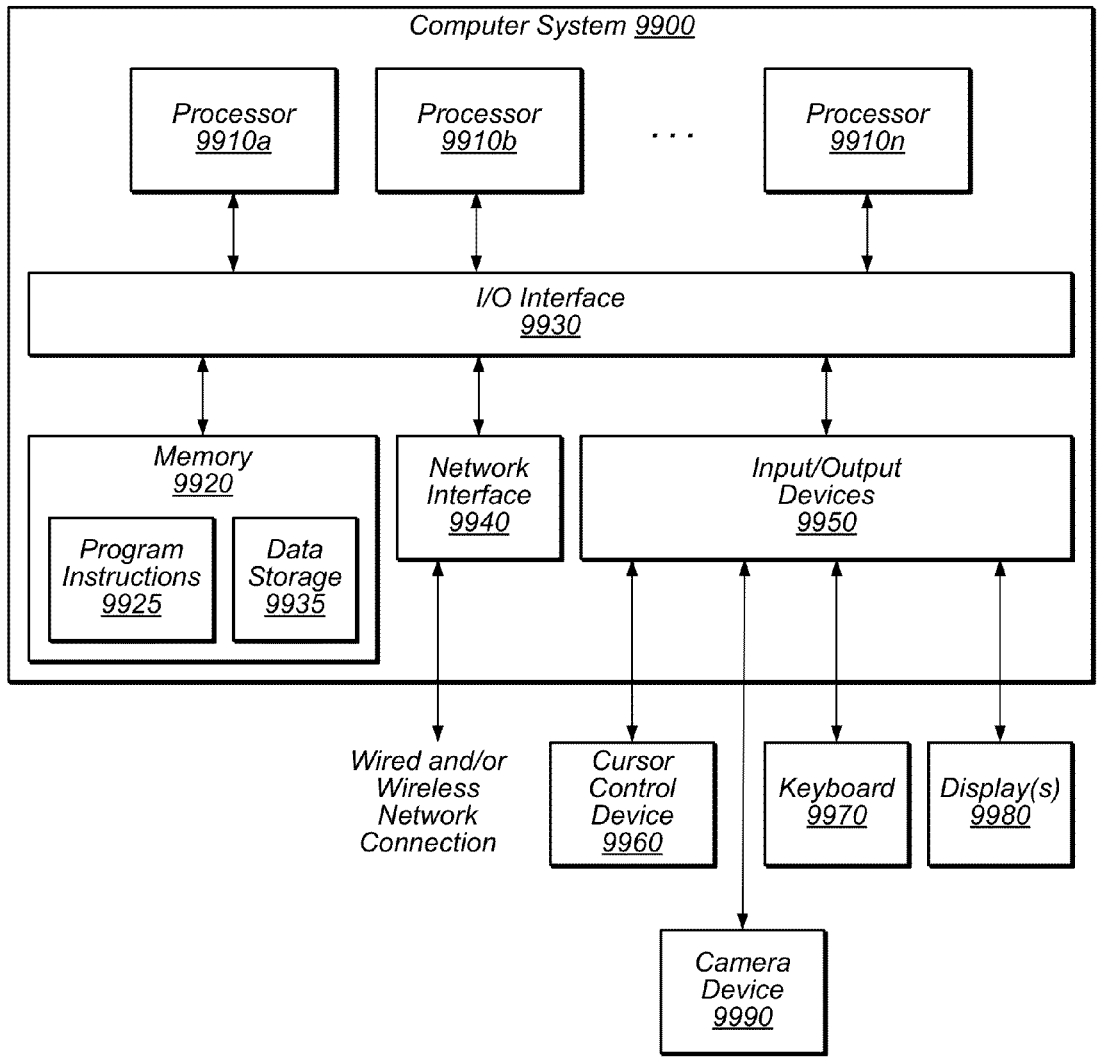
FIG. 8 depicts elements of an example computer system capable of implementing a morphing search tool.

FIG. 8 illustrates computer system 9900 that may execute the embodiments discussed above. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, computer system 9900 includes one or more processors 9910a-9910n coupled to system memory 9920 via input/output (I/O) interface 9930. The computer system further includes network interface 9940 coupled to I/O interface 9930, and one or more input/output devices 9950, such as cursor control device 9960, keyboard 9970, camera device 9990, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented with program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible from a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data may implement desired functions, such as those described above for the various embodiments are shown stored within system memory 9920 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted from transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for another component to use. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data from one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement each of the embodiments described herein. In one embodiment, the program instructions may include software elements of embodiments of the modules discussed earlier. The data storage within the computer system may include data that may be used in other embodiments. In these other embodiments, other or different software elements and data may be included.

Those skilled in the art will appreciate that the computer system is merely illustrative and is not intended to limit the scope of the embodiments described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality depicted within the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read from an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or through a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    performing, by one or more computing devices:
        providing a user interface for specifying an image-based search query;
        receiving input via the user interface selecting an image for use as a search query;
        displaying one or more selectable elements on the image, wherein the selectable elements identify portions of the image that are modifiable;
        receiving input via the user interface making one or more modifications to the image selected for the search query, wherein the input making the one or more modifications is received on one of the selectable elements of the image to move a portion of the image identified by the selectable element and a corresponding symmetrical portion of the image to new positions within the image and thereby modify the image symmetrically;
        performing an image similarity search using the modified image as a search query for the image similarity search; and
        presenting one or more other images as a result of the image similarity search, wherein the one or more images are included in the result based on similarity to the modified image.

2. A system, comprising:
    one or more processors; and
    a memory comprising program instructions, wherein the program instructions, when executed by at least one of the one or more processors perform:
        providing a user interface for specifying an image-based search query;
        receiving input via the user interface selecting an image for use as a search query;
        displaying one or more selectable elements on the image, wherein the selectable elements identify portions of the image that are modifiable;
        receiving input via the user interface making one or more modifications to the image selected for the search query, wherein the input making the one or more modifications comprises dragging the selectable element to a new position to thereby move a portion of the image identified by the selectable element and a corresponding symmetrical portion of the image to new positions within the image and thereby modify the image symmetrically;
        performing an image similarity search using the modified image as a search query for the image similarity search; and presenting one or more other images as a result of the image similarity search, wherein the one or more images are included in the result based on similarity to the modified image.

3. A non-transitory computer-readable storage medium storing program instructions, wherein the program instructions are computer-executable to implement:
provide a user interface for specifying an image-based search query;
receiving input via the user interface selecting an image for use as a search query;
displaying one or more selectable elements on the image, wherein the selectable elements identify portions of the image that are modifiable;
receiving input on a selectable element of the image via the user interface making one or more modifications to the image selected for the search query by moving a respective portion identified by the selectable element and a corresponding symmetrical portion of the image to new positions within the image and thereby modify the image symmetrically;
performing an image similarity search using the modified image as a search query for the image similarity search; and
presenting one or more other images as a result of the image similarity search, wherein the one or more images are included in the result based on similarity to the modified image.

4. The method of claim 1, further comprising:
subsequent to said presenting the one or more images as a result of the image similarity search within the user interface:
receiving additional input via the user interface selecting one of the one or more images presented based on similarity to the modified image; and
repeating said receiving input via the user interface making one or more modifications, and said presenting one or more other images as a result of an image similarity search.

5. The method of claim 1, further comprising:
receiving additional input via the user interface selecting a result image of the one or more images presented based on similarity to the modified image, wherein the result image is for use as a refinement search query; and
receiving additional input via the user interface making one or more modifications to the result image selected for the refinement search query;
performing an image similarity search using the modified result image as a search query for the image similarity search, wherein said performing the image similarity search using the modified result image comprises applying a negative bias to each previously presented image not selected; and
presenting one or more other images as a result of the image similarity search using the modified result image, wherein the one or more images are included in the result based on similarity to the modified result image.

6. The method of claim 1, wherein the image for use as a search query is a silhouette comprising points outlining a shape of the image, wherein each point allows modifications to the image by expanding or contracting the shape of the image.

7. The method of claim 1, wherein the image for use as a search query is provided as input via a user interface element of the user interface for capturing images from a camera coupled to the one or more computing devices.

8. The method of claim 1 wherein the one or more other images presented as a result of the image similarity search are ranked based on the one or more modifications made.

9. The method of claim 1 wherein the input making the one or more modifications is a click and drag moving the portion of the image to a new position.

10. The method of claim 1 wherein the selectable elements are located within and around the image.

11. The method of claim 1 wherein the selectable elements identify portions of the image designated as design features of the image selected.

12. The method of claim 1 wherein the image is a garment and wherein selectable elements comprise pockets, belts, fabric types, neck lines, hem lines, or sleeve lines.

13. The method of claim 1 wherein the images are presented continuously as input is received via the user interface making one or more modifications to the image selected for the search query.

14. The system of claim 2, wherein said performing the image similarity search further comprises:
performing the image similarity search on a product catalog of item images.

15. The system of claim 2, wherein the program instructions, when executed by the at least one of the one or more processors, further performs:
subsequent to said presenting the one or more images as a result of the image similarity search within the user interface:
receiving additional input via the user interface selecting one of the one or more images presented based on similarity to the modified image; and
repeating said receiving input via the user interface making one or more modifications, and said presenting one or more other images as a result of an image similarity search.

16. The system of claim 2, wherein the program instructions, when executed by the at least one of the one or more processors, further performs:
receiving additional input via the user interface selecting a result image of the one or more images presented based on similarity to the modified image, wherein the result image is for use as a refinement search query; and
receiving additional input via the user interface making one or more modifications to the result image selected for the refinement search query;
performing an image similarity search using the modified result image as a search query for the image similarity search, wherein said performing the image similarity search using the modified result image comprises applying a negative bias to each previously presented image not selected; and
presenting one or more other images as a result of the image similarity search using the modified result image, wherein the one or more images are included in the result based on similarity to the modified result image.

17. The system of claim 2, further comprising displaying, on the image, a plurality of selectable elements around a silhouette of an object in the image, wherein input moving the selectable elements changes a shape of the object in the image to provide the modified image used in the image similarity search.

18. The system of claim 2, wherein the image for use as a search query is provided as input by a user.

19. The system of claim 2, wherein the image for use as a search query is provided as input via a user interface element of the user interface for capturing images from a camera coupled to the one or more computing devices.

20. The non-transitory computer-readable storage medium of claim 3, wherein said performing the image similarity search further comprises:
  performing the image similarity search on a product catalog of item images.

21. The non-transitory computer-readable storage medium of claim 3, wherein the program instructions are computer-executable to further implement:
  subsequent to said presenting the one or more images as a result of the image similarity search within the user interface:
    receiving additional input via the user interface selecting one of the one or more images presented based on similarity to the modified image; and
    repeating said receiving input via the user interface making one or more modifications, and said presenting one or more other images as a result of an image similarity search.

22. The non-transitory computer-readable storage medium of claim 3, wherein the program instructions are computer-executable to further implement:
  receiving additional input via the user interface selecting a result image of the one or more images presented based on similarity to the modified image, wherein the result image is for use as a refinement search query; and
  receiving additional input via the user interface making one or more modifications to the result image selected for the refinement search query;
  performing an image similarity search using the modified result image as a search query for the image similarity search, wherein said performing the image similarity search using the modified result image comprises applying a negative bias to each previously presented image not selected; and
  presenting one or more other images as a result of the image similarity search using the modified result image, wherein the one or more images are included in the result based on similarity to the modified result image.

23. The non-transitory computer-readable storage medium of claim 3, wherein the image for use as a search query is provided as input via a user interface element of the user interface for capturing images from a camera coupled to the one or more computing devices.

* * * * *